(12) United States Patent
Defoort et al.

(10) Patent No.: US 8,041,009 B2
(45) Date of Patent: Oct. 18, 2011

(54) WIRED TRANSMISSION LINE TESTING METHOD

(75) Inventors: Frank Cyriel Michel Defoort, Kruibeke-Bazel (BE); Geert Bert Maarten Ysebaert, Winksele (BE)

(73) Assignee: Alcatel Lucent, Paris (FR)

( * ) Notice: Subject to any disclaimer, the term of this patent is extended or adjusted under 35 U.S.C. 154(b) by 1337 days.

(21) Appl. No.: 11/612,675

(22) Filed: Dec. 19, 2006

(65) Prior Publication Data

US 2007/0165788 A1 Jul. 19, 2007

(30) Foreign Application Priority Data

Dec. 23, 2005 (EP) .................................... 05292808

(51) Int. Cl.
*H04M 1/24* (2006.01)
(52) U.S. Cl. .................... 379/1.03; 379/1.04; 379/27.01
(58) Field of Classification Search ................. 379/1.01, 379/1.03, 1.04, 22, 22.01, 22.04, 24, 27.01–27.03, 379/27.08, 28, 29.01–29.04, 30; 324/500, 324/519, 520, 522, 525, 527, 532, 534
See application file for complete search history.

(56) References Cited

U.S. PATENT DOCUMENTS

| 2003/0179858 A1* | 9/2003 | Bella et al. .................. 379/1.03 |
| 2004/0066913 A1* | 4/2004 | Kennedy et al. ................ 379/22 |

FOREIGN PATENT DOCUMENTS

| EP | 0 822 671 A2 | 2/1998 |
| WO | WO 02/089454 A2 | 11/2002 |

OTHER PUBLICATIONS

Alcatel 5530 NA Network Analyzer Release 3.1, Alcatel's Best Practices to Improve User Centric Broadband Services, pp. 1-13, publication date unknown.

\* cited by examiner

*Primary Examiner* — Melur Ramakrishnaiah
(74) *Attorney, Agent, or Firm* — Harness, Dickey & Pierce, P.L.C.

(57) ABSTRACT

The present invention relates to a wired transmission line testing method for determining at least one physical characteristic of a wired transmission line where the wired transmission line is coupled between a first line transceiver device and a second transceiver device. The wired transmission line testing method first comprises the steps of a first transceiver sending a first known excitation signal over the wired transmission line and subsequently the step of the first transceiver and the second transceiver both generating a first representation of a received signal respectively including reflected or forwarded portions of the known excitation signal and third a processing part deriving at least one physical characteristic of the wired transmission line based on the first representations generated by the first transceiver and the second transceiver.

Figure 1:
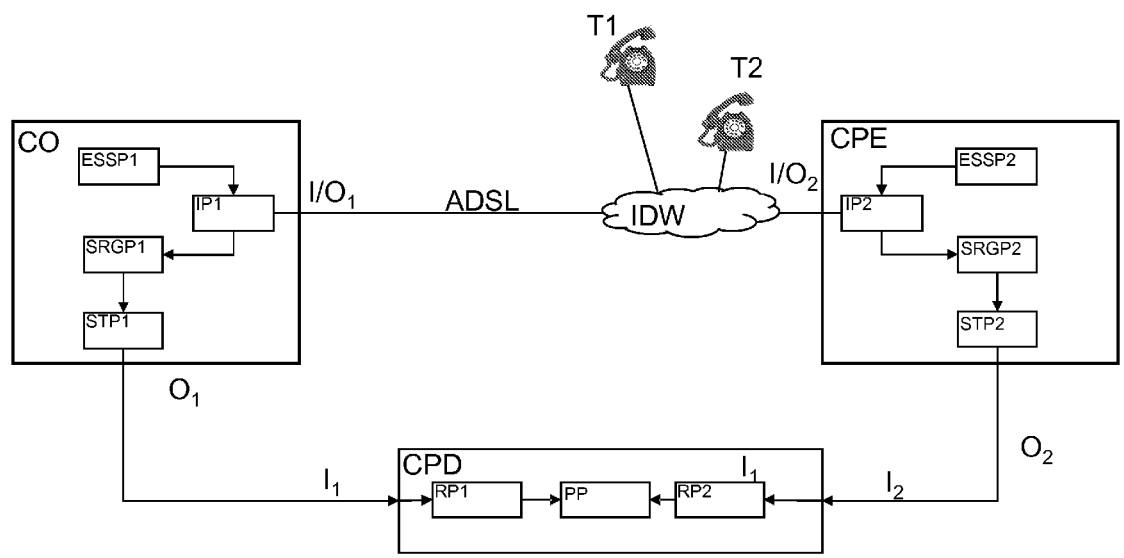

Furthermore, the wired transmission line testing method may comprise the additional steps of the second transceiver sending a second known excitation signal, then first transceiver and second transceiver both generating a second representation of a received signal respectively including forwarded or reflected portions of the second known excitation signal and the processing part deriving the at least one physical characteristic of the wired transmission line based on the first and second representations generated by the first transceiver and the second transceiver.

10 Claims, 1 Drawing Sheet

WIRED TRANSMISSION LINE TESTING METHOD

The present invention relates to a wired transmission line testing method as described in the preamble of claim 1, the related system as described in the preamble of claim 6, a first transceiver as described in the preamble of claim 8, a second transceiver as described in the preamble of claim 9 and a central processing device CPD as described in the preamble of claim 10.

Such a line testing method and related devices are already known in the art, e.g. from the white paper "*Single Ended Loop Testing (SELT) expectations and realities*" from the author Peter J. W. Melsa et al. published in March 2003 by Texas Instruments.

This Single Ended Loop testing method (SELT), like metallic testing from the POTS world, is an automated way of testing a DSL loop from one end of the line, either from the central office or, less likely, from the subscriber's end. Single Ended Loop testing first comprises the sending of an excitation signal from one side to the other, for instance from the central office towards the subscriber's end of the line, and secondly receiving at the same end, i.e. at the central office side in this case, reflections of the excitation signal reflected by the subscriber's line where the reflections amongst others are caused by impedance changes within the line and the end of the line. Based on the received reflection diagram, a loop qualification can subsequently be made.

Such a loop qualification is necessary for determining the length of the loop, whether the loop is made up of mixed-gauge wiring, whether bridged taps are present in the loop and where they are located, whether loading coils are present in the loop, and several other pertinent parameters that influence the maximum achievable data rate. The results of this loop qualification may be used for determining the maximum service level i.e. the quality and performance level of the DSL service that can be provided to the end-users.

Currently, a lot of new DSL connections are installed by the end-users at their home using "do-it-yourself" kits by reusing the existing home phone network for DSL signal transport, together with in-line POTS filters.

Typical appearing faults in DSL in-house wiring due to the DSL-connection installation by the end user are the following:

Missing, wrong, or defect filters causing inadequate shielding of the DSL signal from the non-linearities and transients of the phone equipment, leading to DSL signal corruption, POTS equipment disturbance, acoustic noise, etc.

Unbalanced twisted pairs may cause a massive pick up of impulse noises and RFI in the DSL frequency band in turn leading to DSL errors and instabilities. Additionally too high radiation for humans may be caused.

Bridged taps heavily impact VDSL performance from few-meter bridged tap length on Bad contacts such as oxidations, single-wire connections, and capacitive coupling cause dynamics in physical line characteristics, resulting in DSL instabilities and high susceptibility to ingress.

These faults and issues in the DSL physical wiring between the Central Office and Customer Premises Equipment reduce the maximum service level, leading to an unacceptable error rate on high demanding applications like video, audio streaming, and gaming running over the DSL-connection. Those faults and issues are mainly located inside the houses of the DSL end-users.

However, a weakness of Single Ended Loop Test measurements from the Central Office is that this method has a limited or no accuracy at all for the above mentioned issues far away from CO, e.g. in the houses of the end-users, mainly due to distance between CO and houses.

An object of the present invention is to provide a line testing method of the above known type and a related line testing system but wherein the accuracy of this method is sufficient for determining wired transmission defects, particularly in-house wiring issues such as bridged taps, unbalanced cables, filter problems etc.

According to the invention, this object is achieved by the line testing method as described in claim 1, the related line testing system as described in claim 6, a first transceiver as described in claim 8, a second transceiver as described in the preamble of claim 9 and a central processing device as described in claim 10.

Indeed by sending a first known excitation signal by the first transceiver over the wired transmission line towards the second transceiver and subsequently the first transceiver and the second transceiver both generating a first representation of a received signal respectively including reflected or forwarded portions of the first known excitation signal and by a processing part deriving at least one physical characteristic of the wired transmission line based on the first representations generated by the respective first transceiver and the second transceiver.

Based on these first representations of the reflected and forwarded signal of the first known sent signal the processing part may determine a distortion of the known, sent signal. Subsequently, from the determined distortion, the defects and or characteristics of the wired transmission line are established.

Such a representation of the received signal may be a sampled signal or other means of representing the received signal such as a reflection diagram.

An additional characteristic feature of the present invention is described in claim 2 and claim 7

By, sending a second known excitation signal by means of the second transceiver and subsequently by the first transceiver and the second transceiver both generating a second representation of a received signal which respectively includes a forwarded or reflected portion of the second known excitation signal and in the processing part deriving at least one physical characteristic of said wired transmission line based on the first and second representations generated by the respective first transceiver and second transceiver. In this way by sending a first excitation signal by means of the first transceiver and subsequently by means of the second transceiver sending a second excitation signal, providing the processing part with a double measurement of a double sided received signal, enabling this device to more accurately determining defects and/or characteristics as described above of the wired transmission line.

Another characteristic feature of the present invention is described in claim 3. The second known excitation signal is sent a predetermined period of time after sending the known excitation signal by said first transceiver.

Another characteristic feature of the present invention is described in claim 4.

The first transceiver and the second transceiver send the first and/or said second known excitation signal in a synchronized way. In this way by agreeing a synchronization moment both the first transceiver and the second transceiver are able to send the forwarded known signal, i.e. the excitation signal, and receive portions of the forwarded known signal and the reflections thereof in a synchronized way enabling both devices to put the samples of the received signal in a timing-context and enabling a correct interpretation of the received signals.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawing wherein:

FIG. 1 represents a functional representation of an XDSL access network. This XDSL Access network comprises a first transceiver CO which in our embodiment is a central office in the ADSL access network and a second transceiver CPE which in our embodiment is a customer premises equipment in the ADSL access network central office transceiver CO, a remote unit transceiver CPE, and a central processing device CPD according to the present invention.

In the following paragraphs, referring to the drawings, an implementation of the line testing method in an ADSL access network, the related central office transceiver CO, the remote unit transceiver CPE and the related central processing unit CPU according to the present invention will be described in the first paragraph.

In the second paragraph, all connections between the before mentioned elements and described means are defined. Subsequently all relevant functional means of the mentioned line testing system as presented in FIG. 1 are described followed by a description of all interconnections. In the succeeding paragraph the actual execution of the method for session establishment is described.

Such an ADSL Access Network first comprises a first subscriber line transceiver CO in this embodiment chosen to be a central office transceiver CO that is able to couple a plurality of remote unit transceiver devices such as the remote unit transceiver device CPE to a core-network such as the Internet (not shown). Furthermore, there is a remote unit transceiver device CPE, which may be an ADSL modem or ADSL router/modem, that is able to provide a user terminal access to the Internet. One or more telephones may be connected to the in house wiring IDW and one or more user data-terminals may be connected to the remote unit transceiver device CPE (not shown). It is further to be noted that for reasons of simplicity of this description only one central office transceiver CO is described and moreover only one remote unit transceiver is described although usually a plurality of such remote unit transceivers is coupled to such a central office transceiver CO.

Another network element in this Access network in this present invention is the central processing device CPD, for determining physical characteristics of a digital subscriber line ADSL, where the digital subscriber line ADSL is coupled between the first digital subscriber line transceiver CO and the second digital subscriber line transceiver CPE. The central processing device CPD is adapted to determine this physical characteristics of the digital subscriber line ADSL based on signal representations of the received signal, i.e. portions of the known forwarded signal on one side and reflections thereof on the other side, from the Central Office Transceiver CO and the remote unit transceiver CPE.

These signal representations for instance may be samples or reflection diagrams of the received signal.

The Central office transceiver CO and the remote unit transceiver CPE are coupled over an Asymmetric Digital subscriber Line ADSL. Alternatively the coupling may a be implemented using any other DSL implementation such as VDSL or SHDSL or other DSL variant.

Furthermore, the Central Processing device CPD can be located inside the network, and coupled for instance over a fiber to the Digital subscriber line Access Multiplexer containing the central office transceiver. The central processing device CPD is connected to the remote unit transceiver by means of a virtual channel over the ADSL link, for instance by making use of the CPE Management standard WT-069 of DSL Forum. Alternatively, the Central processing device CPD is coupled to the central office transceiver CO by integrating it into the same Digital subscriber line Access Multiplexer.

Part of the connection ADSL may be constituted by the in-house digital subscriber line wiring IDW. The in-house digital subscriber line wiring comprises the user's in-house wiring coupling the user-terminals such as telephones T1, T2 fax-machines etcetera to the remote unit transceiver CPE which here is implemented by an ADSL modem.

The central office transceiver CO comprises a first excitation signal sending part ESSP1 that is adapted to send a known excitation signal over the digital subscriber line ADSL towards the remote unit transceiver device CPE, a first signal representation generating part SRGP1 that is adapted to generate a representation of a received signal including reflected or forwarded portions of the known excitation signal generated by the first or second DSL transceiver CO, CPE and a sample transmitting part STP1 that is adapted to forward the generated signal representations, which for instance may be samples, or processed samples, e.g. reflection diagrams of the received signals, to a central processing device CPD.

The central office transceiver CO further comprises an interfacing part IP1 that is able to interface between the transmitting and receiving part of the central office transceiver CO and the digital subscriber line ADSL, i.e. dealing with the reception of signals and the sending of signals.

The remote unit transceiver CPE, in turn may comprise a second excitation signal sending part ESSP2 that is adapted to send a second known excitation signal over the digital subscriber line ADSL towards the central office transceiver CO, a second signal representation generating part SRGP2 that is adapted to generate a representation of a received signal including reflected or forwarded portions of the known excitation signal generated by a first or second DSL transceiver CO. CPE, a sample transmitting part STP2 that is adapted to forward these generated signal representations of the received signals to a central processing device CPD. The remote unit transceiver CPE further comprises an interfacing part IP2 that is able to interface between the transmitting and receiving part of the central office transceiver and the digital subscriber line, i.e. dealing with the reception of -signals and the sending of signals.

The Access Network of the present invention further comprises, a central processing device CPD that in turn comprises a first receiving part RP1 that is adapted to receive the signal representations of received signals including respectively the forwarded known excitation signal or reflected portions of the forwarded known excitation signal from the central office transceiver CO, a second receiving part RP2 that is adapted to receive the signal representations of received signals from the remote unit transceiver CPE, and a processing part PP that is able to derive at least one physical layer characteristic, such as the physical line length of the digital subscriber line ADSL based on the signal representations forwarded by both the central office transceiver CO and the remote unit transceiver CPE.

It is to be noticed that the central processing device CPD alternatively may comprise a single reception part, for the receiving samples of the central office receiver CO and for receiving the samples of the remote access unit transceiver CPE It is further to be noticed that although in this embodiment the processing part is implemented in a central processing device CPD, it is at least equivalent to incorporate this processing part PP in the central office CO or even in the remote unit transceiver CPE In order to explain the execution of the present invention it is supposed that the central office transceiver CO and the remote unit transceiver CPE agrees during a handshaking procedure to send the known excitation signal in a synchronized way by for instance negotiating such synchronisation through bit settings in the Standard Information Field (SIF) or Non-Standard Information Field (NSIF) of the ITU G.994 handshake standard.

Once synchronisation is negotiated, then both transceivers know exactly at what time first (assume from CO) and second (assume from CPE) excitation signal will be transmitted.

Then for instance, the central office transceiver CO starts sending, by means of the first excitation signal sending part ESSP1 and the corresponding interfacing part IP1, a known excitation signal over the digital subscriber line ADSL towards the remote unit transceiver device CPE, at a time corresponding to the agreed synchronization of transmitter and receiver.

The known excitation signal, which for instance has the shape of a frequency sweep signal, which for instance may include all frequencies of the Digital subscriber line spectrum, an impulse signal or even a pulse (train) signal propagates along the digital subscriber line ADSL and the in-house digital subscriber line IDW towards the remote unit transceiver CPE.

The signal representation generating part SRGP2 of the remote unit transceiver CPE then generates a signal representation by sampling this received signal, which includes the forwarded known excitation signal. In the mean time a portion of the forwarded known signal is reflected at different parts of the digital subscriber line ADSL (e.g. at each cable gauge change, at each impairment) and travels back along the digital subscriber line ADSL, towards the source of the excitation signal, i.e. the central office transceiver CO. The signal representation generating part SRGP1 of the central office transceiver CO also generates a signal representation, which in this case is the sampling of the received signal that here includes the reflected portions of the known excitation signal.

The sample transmitting part STP2 of the remote unit transceiver CPE subsequently forwards the samples of the received signal, i.e. samples of the received forwarded portion of the known excitation signal including the timing information to the central processing device CPD. The sample transmitting part STP1 of the central office transceiver CO subsequently forwards the samples of the received signal, i.e. the samples of reflections of the known excitation signal including timing information to a central processing device CPD.

The first receiving part RP1 and second receiving part RP2 of the central processing device CPD receive these samples of the received signal including respectively the forwarded known excitation signal or reflected portions of the forwarded known excitation signal from respectively the central office transceiver CO and the remote unit transceiver CPE. The processing part PP of the central processing device derive at least one physical layer characteristic of the digital subscriber line ADSL, such as physical loop topology from the samples forwarded by both the central office transceiver CO and said remote unit transceiver CPE The samples are processed by the processing part PP to determine amplitude peaks, which indicate an impedance change in the ADSL wiring. Such impedance changes cause a part of the signal to be reflected with a certain phase, and a part of the signal to be forwarded. The time between the different peaks can be recalculated to the distance between transmitter and the impedance change, taking into account the signal propagation speed in this ADSL wiring. From the peak amplitudes, phases, and distances derived from both forwarded and reflection sampled signal data, the processing part PP can now determine the total loop length, position of cable gauge transitions, location and length of bridge taps, termination of bridge taps, etc. The fact that the forwarded and reflected signal are processed simultaneously results in an ability to have a twice as high looplength detection power compared to Single Ended Loop Testing (SELT), and a twice as high impedance change detectability at each of the points in the ADSL wiring where the signal gets adapted (a part of the signal is reflected, remaining part is forwarded in a changed shape). Combining those measurements for the forwarded and the reflected signal will result in the capability to measure longer loops than when only the reflected signal would be used, and a higher accuracy on the nature, the detection, and localisation of the impedance changes In the following an even more advantageous implementation of the present invention is described.

The results of the previously described measurements can even be improved by, the opposite end of the digital subscriber line ADSL, i.e. the second known excitation signal sending part ESSP2 of the remote unit transceiver, in turn and a certain period of time after the sending of the first known excitation signal later sending a second known excitation signal over the digital subscriber line ADSL towards the central office transceiver CO.

This second known excitation signal may be a frequency sweep signal, which for instance may use all frequencies of the Digital subscriber line spectrum, an impulse signal or even a pulse (train) signal. It is to be noted that this second known excitation signal is not necessarily the same signal as the first known excitation signal.

The signal representation generating part SRGP1 of the central office transceiver CO also generates a signal representation, which here is the sampling of the received signal. In the mean time a portion of the forwarded second known signal is reflected at different locations of the ADSL line, and travels back along the digital subscriber line ADSL, to the source of the excitation signal, i.e. the remote unit transceiver CPE. The signal representation generating part SRGP2 of the remote unit transceiver CPE also samples the received signal, here including the reflected portions of the second known excitation signal.

The sample transmitting part STP2 of the remote unit transceiver CPE subsequently forwards the samples of the received signal, i.e. here including samples of the reflected portion of the second known excitation signal, to the central processing device CPD. The sample transmitting part STP1 of the central office transceiver CO subsequently forwards the samples of the received signal, i.e. including samples of the forwarded second known excitation signal, to a central processing device CPD.

The first receiving part RP1 and second receiving part RP2 of the central processing device additionally receive these samples of the received signals including respectively forwarded or reflected portions of the second known excitation signal from respectively the central office transceiver CO and the remote unit transceiver CPE. The processing by combining the samples of the received signals of the known excitation signal and samples of a reflection thereof together with the samples of the received signals of the second known excitation signal and samples of a reflection thereof the processing part PP of the central processing device can derive at least one physical layer characteristic of the digital subscriber line from the samples forwarded by both the central office transceiver CO and said remote unit transceiver CPE in a even more accurate way. The processing is done in a similar way as is described above.

Both the signal representation generating parts SRGP1, SRGP2 take account of the time expired between sending and the reception of the respective forwarded signal at the remote unit transceiver CPE and the reflected portions of the known signal at the central office transceiver CO.

An additional remark is that although this embodiment describes the incorporating of the processing part in a central network element, the processing part alternatively may be incorporated in the central office transceiver CO or even in the remote unit transceiver CPE.

It is further to be noted that although the present invention is described in an ADSL access network this invention also may be applied in for instance coaxial networks, or over fiber networks.

A further remark is that the signal representation the received signal may be a sampled signal or other means of representing the received signal such as a reflection diagram.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A wired transmission line testing method for determining at least one physical characteristic of a wired transmission line, said wired transmission line being coupled between a first line transceiver device and a second transceiver device, said method comprising:
sending, by said first transceiver, a first known excitation signal over said wired transmission line;
generating, by said first transceiver and said second transceiver, a first representation of a received signal respectively including reflected or forwarded portions of said known excitation signal; and
deriving, by a processing port, said at least one physical characteristic of said wired transmission line based on said first representations generated by said first transceiver and said second transceiver.

2. The method according to claim 1, further comprising:
sending, by said second transceiver, a second known excitation signal;
generating, by said first transceiver and said second transceiver, a second representation of a received signal respectively including forwarded or reflected portions of said second known excitation signal; and
deriving, by said processing part, said at least one physical characteristic of said wired transmission line based on said first and second representations generated by said first transceiver and said second transceiver.

3. The method according to claim 2, wherein said second known excitation signal is sent, by said second transceiver, a period of time after sending said first known excitation signal by said first transceiver.

4. The method according to claim 1, wherein said first transceiver and said second transceiver send at least one of said first and said second known excitation signal in a synchronized way.

5. The method according to claim 1, wherein said wired transmission line includes in-house digital subscriber line wiring.

6. A wired transmission line testing system for determining at least one physical characteristic of a wired transmission line comprising:
a wired transmission line being coupled between a first transceiver and a second transceiver;
a first transmit unit in said first transceiver configured to send a first known excitation signal over said wired transmission line:
a first signal representation generating part in said first transceiver configured to generate a first representation of the received signal including reflected portions of said first known excitation signal;
a second signal representation generating part in said second transceiver configured to generate a first representation of the received signal including forwarded portions of said first known excitation signal; and
a processing part configured to derive at least one physical characteristic of said wired transmission line from said first representations generated by said first transceiver and said second transceiver.

7. A line testing system according to claim 6, wherein
said second transceiver further comprises a second transmit unit configured to send a second known excitation signal over said wired transmission line towards said first transceiver,
said first signal representation generating part further configured to generate a second representation of the received signal including forwarded portions of said second known excitation signal;
said second signal representation generating part further configured to generate a second representation of the received signal including reflected portions of said second known excitation signal; and
said processing part is further configured to derive said at least one physical characteristic of said wired transmission line based on said first and second representations generated by said first transceiver and said second transceiver.

8. A first transceiver configured to determine physical characteristics of a wired transmission line, said wired transmission line being coupled between said first transceiver and a second transceiver, said first transceiver, comprising:
a first transmit unit, configured to send a known excitation signal over said wired transmission line towards a second transceiver;

a signal representation generating part, configured to generate a representation of a received signal including reflected or forwarded portions of said known excitation signal generated by said first or second transceiver; and a processing part, configured to derive at least one physical characteristic of said wired transmission line from said representations forwarded by said first transceiver and said second transceiver.

9. A second transceiver, configured to determine physical characteristics of a wired transmission line, said wired transmission line being coupled between a first transceiver and said second transceiver wherein said first transceiver, comprises:

a second signal representation generating part, configured to generate a representation of a received signal including reflected or forwarded portions of said known excitation signal generated by said first or second transceiver; and a processing part, configured to derive at least one physical characteristic of said wired transmission line from said representations forwarded by said first transceiver and said second transceiver.

10. A central processing device, configured to determine physical characteristics of a wired transmission line, said wired transmission line being coupled between a first transceiver and a second transceiver wherein said central processing device, comprises a processing part configured to derive at least one physical characteristic of said wired transmission line from representations of a signal received at said first transceiver and said second transceiver, said signal including reflected or forwarded portions of a known excitation signal, said representations respectively being forwarded by said first transceiver and said second transceiver.

* * * * *